United States Patent [19]

Wahl et al.

[11] 4,371,934
[45] Feb. 1, 1983

[54] VEHICLE TRIP COMPUTER

[75] Inventors: Josef *Wahl*, Stuttgart; Peter-Jürgen *Schmidt*, Schweiberdinger; Jörg *Birmelin*, Bretten; Ferdinand *Grob*, Besigheim; Rolf *Kohler*, Trossinger; Erich *Zahler*, Karlsruhe; Frieder *Heintz*, Stutensee; Wolfgang *Bremer*; Viktor *Köpernick*, both of Ettlingen; Robert *Hugel*, Stutensee-Frie.; Andreas *Weigl*, Ettlingen; Günther *Baumann*, Stuttgart, all of Federal Republic of Germany

[73] Assignee: Robert Bosch GmbH, Stuttgart, Fed. Rep. of Germany

[21] Appl. No.: 140,797

[22] Filed: Apr. 16, 1980

[30] Foreign Application Priority Data

May 4, 1979 [DE] Fed. Rep. of Germany ....... 2917957
Jan. 17, 1980 [DE] Fed. Rep. of Germany ....... 3001470

[51] Int. Cl.³ .............................................. G06F 3/14
[52] U.S. Cl. ................... 364/424; 364/444; 364/709; 340/365 R
[58] Field of Search ............... 364/424, 444, 565, 446, 364/705, 709, 518; 340/52 F, 365 R, 365 S, 709, 378.3, 723, 802; 116/28 R, 62, 62.4

[56] References Cited

U.S. PATENT DOCUMENTS

| 3,824,723 | 7/1974 | Gargas | 340/378.3 |
|---|---|---|---|
| 3,964,302 | 6/1976 | Gordon et al. | 340/52 F |
| 4,028,695 | 6/1977 | Saich | 340/709 |
| 4,120,040 | 10/1978 | Aihara | 364/705 |
| 4,126,898 | 11/1978 | Spangler et al. | 364/709 |
| 4,149,257 | 4/1979 | Nakagiri et al. | 364/705 |
| 4,185,281 | 1/1980 | Silverstone | 340/709 |
| 4,216,530 | 8/1980 | Yamaki et al. | 364/424 |
| 4,232,299 | 10/1980 | Eisenberg | 340/365 R |

FOREIGN PATENT DOCUMENTS 2252854 5/1973 Fed. Rep. of Germany .
2339600 2/1975 Fed. Rep. of Germany .
549804 5/1974 Switzerland .
1401356 7/1975 United Kingdom .

OTHER PUBLICATIONS

"Trip Computer is Microprocessor-Based", Published in Automotive Engineering, vol. 86, No. 10, in Oct. 1978, pp. 56-61.
"μP and μC-Based Control Systems Cut Engine Pollution, Up Mileage", Published in Electronic Design, No. 15, in Jul. 19, 1978, pp. 20-26.
"Automotive Control Development System" by Auman et al., Published on Society of Automotive Engineers, Paper No. 780433.
"Managing Automotive Microprocessor Interfaces" by Long, Published on Society of Automotive Engineers, Paper No. 780121.

*Primary Examiner*—Gary Chin
*Attorney, Agent, or Firm*—Frishauf, Holtz, Goodman & Woodward

[57] ABSTRACT

To provide a suitable number of display fields (e.g. ARRIVAL; TIME; etc.), each of which characterizes and identifies the significance or import or meaning of a displayed numerical value on a display device (16), the display fields are associated in groups or sets (11-15; 42-45) having a particular geometric position (columns; segmental), and a plurality of keys (21-25) are provided with each key being associated with a group or set of the display fields, and connected to a counter (61) to select a particular one of the display fields within the group or set by the number of key operations, the numerical value associated with the display field then being displayed on the numerical display (16). The display and keys are connected to a computer (62) which provides the output data for the numerical indicator (16); an input/output control switch (26) is provided to change the function of the display group selection keys (21-25) to permit data entry into the computer (62), for example of speed limit, driving distance, and the like.

25 Claims, 7 Drawing Figures

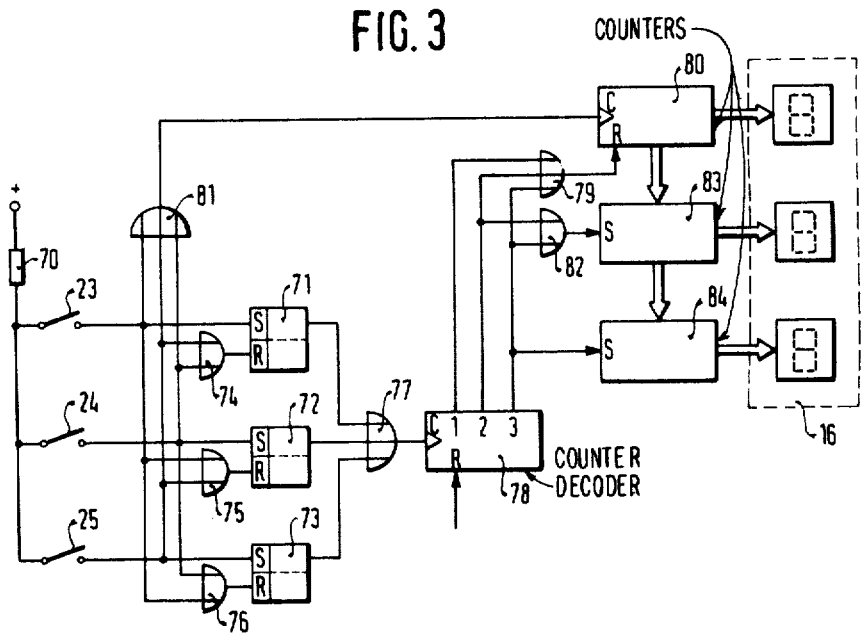
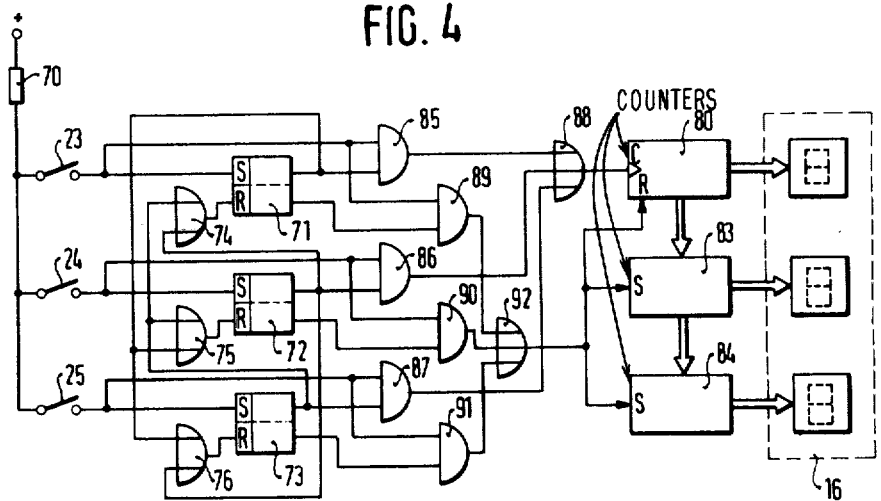

VEHICLE TRIP COMPUTER

The invention relates to a trip computer for vehicles, with an operating component for entry and/or interrogation of data and an optical indicator or display device for these data. The indicator device contains a plurality of indicator or display fields arranged thereon which identify and characterize data shown on a numerical output display. The numerical indicator device displaying the given data value provides the numerical data selected by the keys of the operating component which, preferably, have a placement arrangement corresponding to that of the associated indicator fields. The actuation of a key causes an optical and/or acoustic identification of the addressed indicator or display field and a corresponding correlation of the data displayed in the numerical indicator device.

BACKGROUND AND PRIOR ART

Dynamic data, for example, temperature, time, or other instantaneous parametric values relating to the vehicle or to the propelling engine, can usually be retrieved in a trip computer. Data can also be computed from these values and/or from values entered by the driver and likewise retrieved according to need. Typical applicable values are the instantaneous fuel consumption, the fuel consumption over a definite elapsed time or traversed road distance, as well as timing and road data relating to the already traversed as well as the yet to-be traversed portions of the road. A number of such vehicle trip computers are already known and described, for example, in U.S. Pat. No. 3,964,302, British Pat. No. 1,537,962, the German Disclosure Document DE OS 2 252 854(to which British Pat. No. 1,401,356 corresponds), the SAE-papers 780,121 and 780,433, and the periodicals Electronic Design number 15, July 19, 1978, Pages 20 to 26, and Automotive Engineering, October 1978, pages 56 to 60. The vehicle trip computers described there serve to improve driving comfort and safety, inasmuch as the driver can recall all desired information at any time and also enter new information by way of an enter/recall (input/output) unit. However, the attention of the driver may be diverted from observation of the road during the operating and reading maneuvers so that, while more information is available to the driver, the danger of accidents is increased.

THE INVENTION

It is an object of the present invention to provide a trip computer and display which results in the least possible distraction of the driver. Operating the keyboard of the trip computer is possible without requiring the driver to shift his gaze from the road toward the keyboard.

Briefly, according to the invention, an indicator or display device is provided in which a plurality of indicator or display fields are located, arranged in a predetermined geometric pattern, for example in columns, along the circumference of a circle in sectors thereof, or the like. The indicator device further includes a numerical display, for example of the segmental type. The indicator or display fields each characterize and identify the significance or import of numerical values which are displayed on the numerical display. An operating key is associated with each one of the sets or groups of display fields, the operating key being connected to a counting apparatus which counts the number of operations of any one of the keys, the specific number of sequential operations of the key being associated with specific ones of the display fields in the group or set. Thus, for example, a key associated with a first row of fields, operated twice, will cause an indication to be derived from the second one of display fields in the first group or set. Actuation of a key provides for optical output on the display and/or acoustic identification of the import or significance, or meaning of the numerical values which are displayed by the numerical indicator.

A substantial number of display fields thus can be addressed by only a small number of keys; preferably, a given key is assigned to a given set or group of indicator or display fields in a similar geometric arrangement. Thus, the correct key can be identified easily and rapidly by touch sensing. The reduction of the required number of keys is further enhanced by assigning keys multiple functions under input and output, or display conditions. Under input conditions, for example to enter a required trip distance, the vehicle will most likely be stationary and full attention can be given to the multiple functional use of the key; under driving or operating condition, each key has only the sole function of selecting a given display field within the set or group, in accordance with its position in the set by a corresponding number of key operations, so that distraction of the driver from traffic conditions is minimized.

Acoustic identification can also take place in addition to or instead of the optical acknowledgment of data interrogation (retrieval) and data entry. A particularly flexible operating process is made possible by wireless operation, i.e. where the operating component is removable from its mounting and transfers its data commands by for example, infrared rays. In this manner, passengers are also given the opportunity to operate the vehicle trip computer.

Other features and characteristics will emerge from the description of two exemplary embodiments of the invention which relate to the drawing.

DRAWING

FIG. 3 is a diagram of a first embodiment of a data input circuit;

FIG. 4 is a diagram of a second embodiment of a data input circuit;

DESCRIPTION OF THE PREFERRED EXEMPLARY EMBODIMENTS

Figure 1:
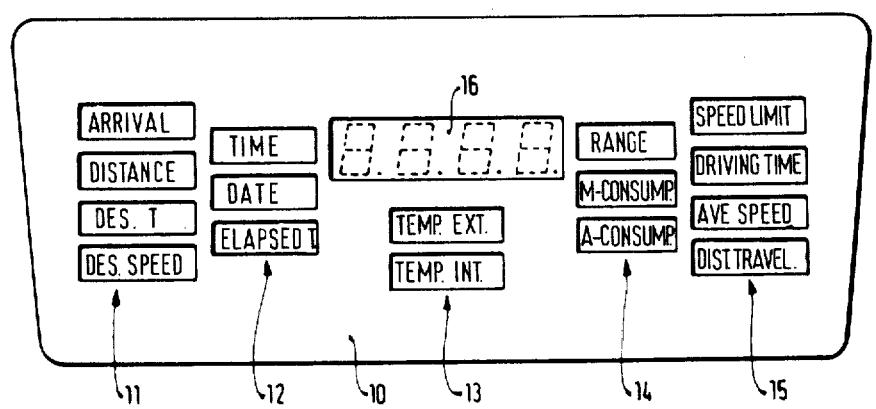
FIG. 1 is a graphic layout of an indicator device of a first exemplary embodiment.

The indicator or display device 10 represented in FIG. 1 has sixteen illuminable indicator or display fields in five adjacent columns. The indicator fields are assigned to specific retrievable data or enterable data units, a given associated indicator field being accentuated optically, for example, by switching-on a lamp not further described, upon selection of that data unit. The remaining data units are likewise readable at all times. In order to facilitate reading the information in darkness, all of the indicator fields can be equipped with base illumination, the selected indicator field being illuminated more intensely. The data units assigned to the first column 11 of indicator fields are:

The anticipated arrival time (ARRIVAL), the prospective road section (DISTANCE), the desired arrival time (DES. T.), and the then desirable speed (DES. SPEED). The complete prospective road section distance must be entered into the computer at the beginning of the trip for the computation of the prospective arrival time and for the computation of the currently remaining road section distance. Upon entering a desired arrival time and trip distance, the computer computes the required demand or command or desirable speed. The second column 12 contains data units for the display of which no manual entry of numerical data is required. These are the clock time (TIME), the calendar date (DATE), and the switch over from the indicated clock time to its function as a stop watch (ELAPSED T.). The third column 13 contains purely read-out data, i.e. numerical field 16 the outside temperature (TEMP. EXT.) and the interior temperature (TEMP. INT.). The fourth column 14 contains the following data units:
the remaining range based on the current fuel tank contents (RANGE), the instantaneous or momentary fuel consumption (M-CONSUMP), and the average fuel consumption (A-CONSUMP). The computer needs information concerning the current fuel tank content and of the average or instantaneous fuel consumption in order to compute the range. The computer receives the instantaneous fuel consumption data from a fuel consumption meter, and averages the values received over a specific time interval or distance to obtain the average fuel consumption. The fifth column 15 identifies these data:
Entered or attained speed limit value (SPEED LIMIT), elapsed driving time (TRIP TIME), the average speed over the distance traversed up to the present time (AVE SPEED), and the traversed road section (DIST. TRAVEL.)

If a desired speed is entered, attaining or exceeding this limiting value is indicated by a special optical or acoustic identification. For example, the indicator field "SPEED LIMIT" can be identified by blinking illumination. In addition, a warning sound can be switched on. The three remaining data units are retrievable data which do not require any special entry. The start of the trip must merely be identified as such, which can, for example, take place as a result of switching on the ignition. As further explained below, these three data units can also be summed over a longer time-period, for example, an entire vacation trip. A special switching function is required in this case.

A numerical indicator display 16 is located above the middle column 13, and it serves to display the entered or retrieved numerical values of the selected information. This numerical indicator device is embodied as a 4-digit display, but some other number of digits is also possible. The indicator elements commonly chosen for this purpose are 7-segment elements.

The entry and retrieval of data, and the computation of data based on entered values or values obtained by sensors in the motor vehicle are not restricted to data described above but rather encompass a plurality of further possibilities. The present invention relates primarily to the manner of data entry and retrieval; more detailed particulars for the processing of the data being omitted because any one of several known methods of data processing and computation can be selected as suitable for this purpose.

Figure 2:
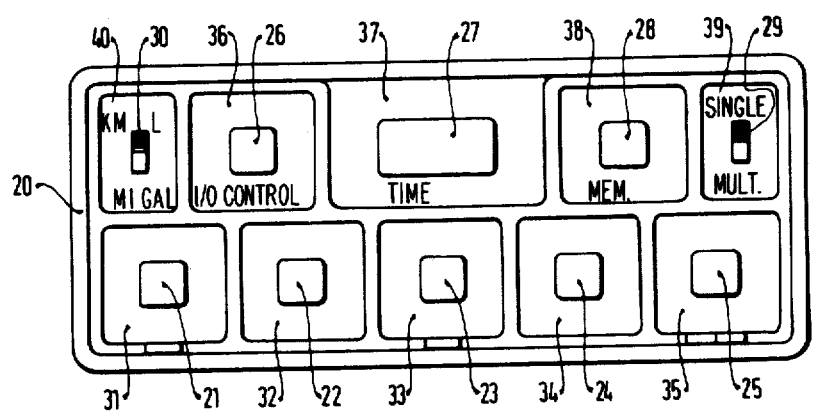
FIG. 2 is a graphic layout of an operating component of a first exemplary embodiment.

In the operating component unit 20 shown in FIG. 2, eight keys 21 to 28 and two switches 29, 30 are located in corresponding grip indentations 31 to 40, where a given grip indentation containing a key, or a switch, has a reference numeral that is higher by 10 than the numeral of the associated key or switch. These grip indentations 31 to 40 make it easier for the driver to find the keys and switches, without looking at the unit.

The manner of operation of the operating component unit 20 in conjunction with the indicator device 10 and with the computing component not further described is based on the fact that the keys 21 to 25 assigned, respectively, to columns 11 to 15, lie adjacent to one another in the same manner as the indicator fields assigned to the columns. If, for example, the key 21 is actuated, the top indicator field of the column 11 lights up, and the corresponding numerical value, indicating, in this case, the prospective arrival time, appears in the numerical indicator device 16. Each further actuation of the key 21 causes a switch to the next indicator field of the column 11 to be illuminated, and the corresponding value displayed on indicator 16. After the last indicator field is reached, either a shift to the first indicator field occurs or the indicator fields are addressed sequentially from bottom to top. Upon each such actuation, the associated value appears in the numerical indicator device 16. If another key is actuated, for example the key 24, then the first indicator field "RANGE" of the column 14 associated with key 24 lights up, while a previously lighted indicator field is darkened. Accordingly, the driver actuating a key "blindly", sees immediately which data unit he or she has addressed, and also knows immediately upon an erroneous actuation whether he or she must actuate a key lying further to the left or further to the right in order to reach the desired data unit. Access to a large number of data units can be accomplished with few keys by means of this serial data interrogation. The data, thus, are retrieved and displayed, and the significance of the data being displayed is indicated, all with operation of only a single key.

Let it be assumed that at the beginning of a trip, data are to be entered, for example the distance to the destination of the trip. The driver first selects the information to be entered, in the present case by pressing key 21 twice. Thereafter, he actuates the key 26 (I/O CONTROL), which is a control switch to change from data output (retrieval) to data input (entry). This status is now again indicated optically and/or acoustically, preferably by means of, for example, a rhythmic flashing of the decimal points after the numerals of the numerical indicator device 16. Actuation of the key 26 also results in switching the operating function of the keys 24 and 25. Keys 24, 25 have now been connected such that numerical values can be entered. Repeated actuation of the key 25 causes the right-most digit of the numeral indicator device 16 to step through the numbers 1-9. At the fifth actuation, the numeral five therefore appears at this location. Thereafter, the entered numeral is shifted to the left by one digit by means of the actuation of the key 24. Now the next numeral can be entered with the aid of the key 25. This entering and shifting operation is repeated until the complete number has been entered. The entered number is now transferred to the computer i.e. into memory by actuation of the key 28 (MEM.), and is made available for the associated computation. The operating component unit is now again switched to "interrogation".

The circuit shown in FIG. 3 represents a simple method for data entry. It permits random operation of keys for data entry. To simplify the diagram, three key switches 23 to 25 are arbitrarily chosen from the key switches 21 to 25, and are connected on one side to a positive voltage source via a resistor 70. The opposite connection of the key switches 23 to 25 is made to the respective set-input S of three RS-flipflops 71 to 73. Each key switch further is connected to the reset-inputs R of the two flipflops of the other two key switches via three OR-gates 74 to 76. The outputs of the three flipflops 71 to 73 are connected via an OR-gate 77 to the clock input C of a counter 78 having a built-in decoder. The first decoding output is connected via an OR-gate 79 to the reset-input R of a further counter 80, whose clock input C is connected via an OR-gate 81 to the three key switches 23 to 25. The second decoding output of the counter 78 is connected to a further input of the OR-gate 79 and is also connected via an OR-gate 82 to the set-inputs S of a further counter 83 used as an intermediate memory. Finally, the third decoding output is connected to a further input of each of the OR-gates 79, 82 and to the set-input of a further counter 84 used as an intermediate memory. The numerical outputs of the counter 80 are connected to the numerical inputs of the counter 83, whose numerical outputs in turn are connected to the numerical inputs of the counter 84. The numerical outputs of the counters 80, 83, 84 are further connected to the numeral indicator 16, one counter being assigned to each digit. Because the entered data must be evaluated, the numerical outputs of the counters 80, 83, 84 are also connected to the computing section of the vehicle trip computer in a manner not shown.

Operation: Any desired key 23–25, or 21–25, can be used for entering the first digit. This key is actuated either once or repeatedly in correspondence to the number desired. Upon the first actuation, the flipflop is set, for example, the flipflop 71 is set upon actuation of the keyswitch 23. The two other flipflops 72, 73 are simultaneously reset. A signal appears at the first decoding output of the counter 87 and this signal resets the counter 80. This fact has no effect at this time, as all of the counters and flipflops must be reset anyway by an initialization circuit prior to a new entry. Every subsequent actuation of the keyswitch 23 is counted in the counter 80, and becomes visible in the numeral indicator device 16. The entry of the next digit can be effected by any other desired key-switch, for example the keyswitch 25. Its first actuation sets the flipflop 73 and resets the two flipflops 71, 72, thereby shifting the signal at the first decoding output of the counter 78 to the second decoding output. This signal transfers the content of the counter 80 to the counter 83 by setting the set-input of the counter 83 and by then resetting the counter 80. A further actuation of the keyswitch 25 again results in a upward count in the counter 80. In order to enter a third digit, any other desired keyswitch is chosen, for example, once again the keyswitch 23. Now a signal is generated at the third decoding output of the counter 78 and this signal transfers the content of the counter 83 into the counter 84, and transfers the content of the counter 80 into the counter 83. The counter 80 is once again reset. By means of suitable switching procedures not shown, for example by using delay elements, the transfer of data is made to take place consecutively to prevent loss of data. The third and last digit can now be entered by means of the keyswitch 23.

The circuit shown in FIG. 4 is a variation of the circuit according to FIG. 3. Once again, any desired key 23–25 can be used for numerical entry. However, once a given switch is actuated, it retains this function whereas the remaining keys can be selected arbitrarily for shifting digits. The interconnections between the key switches 23–25 and the flipflops 71 to 73 is the same as in the circuit according to FIG. 3, but the output of a given flipflop is connected to the reset inputs of the two other flipflops via the OR-gates 74–76. The set input and the output of each of the flipflops 71 to 73 are linked to one another by means of the three AND-gates 85–87 whose outputs are connected via an OR-gate 88 to the clock input C of the counter 80. The set-inputs and the complementary outputs of the flipflops 71–73 are linked to one another by means of three further AND-gates 89–91 whose outputs 91 are connected via an OR-gate 92 to the reset input of a counter 80 and to the set inputs of the counters 83, 84. The circuit of the numerical indicator device 16 is the same as that of FIG. 3.

Operation-circuit of FIG. 4: If one of the keyswitches 23–25 is actuated, the associated flipflop is set and its output sets and holds reset the two other flipflops as the reset inputs are meant to have priority. From this time on, counting pulses can only be conducted over this arbitrarily selected keyswitch, for example the key switch 24, to the counter 80 via the OR-gate 88, because the two AND-gates 85, 87 remain continuously blocked due to the reset flipflops 71, 73. The AND-gate 90 also remains blocked due to the set flipflop 72, while the AND-gates 89, 91 are open to switching signals of the key switches 23 and 25. These signals once again shift the digits in the counter assembly 80, 83, 84 as in the circuit shown in FIG. 3. Here too, suitable delay devices must be provided to avoid loss of data. The circuit functions of the key switches 23–25 and 21–25, depicted in FIG. 3 and FIG. 4 respectively, can also be realized by software that programs the built-in computer.

The data entry scheme described with the aid of FIG. 3 and FIG. 4 requires prior actuation of the key 26, which can switch the functions of the keys 21 to 25. It is also possible to separate the data retrieval and the numerical entry i.e. to perform these functions by means of separate keys, and thereby dispense with this switching apparatus.

Instead of using the above-described methods for numerical entry, it is also possible to assign to each digit of the numerical indicator device a separate key for serial numerical entry. The dual utilization of the keys 21–25 permits the number of keys to be no greater than before as long as the number of digits of the numerical indicator 16 does not exceed the number of keys 21–25. The example using two keys, could be modified by assigning one key to the shifting of digits, another key to serve for serial scanning of the numerical values from low to high, and a third key to serve for serial scanning of numbers from high to low.

The separate key 26 for switching the function to data entry can be omitted if the keys 21–25 are two-staged keys where a relatively slight finger pressure lights up the assigned data unit in one of the columns 11–15 while a greater finger pressure on the same key switches the function to data entry. Suitably, a definite pressure threshold between the two switching positions must be exceeded to attain the second position.

If the two keys 26 and 28 are actuated in direct succession without intervening entry of a numerical value by means of the keys 24, 25, then the momentary sensor value is used for data entry. If, for example, a demand or desired speed is to be entered, the key 21 must first be pressed four times to reach DES. SPEED, after which the key 26 is actuated. This places the system into the "input" mode. If the key 28 is now immediately actuated without any entry of numerical values, then the instantaneous speed is transferred to memory as a demand value entry. If this entered demand value is exceeded, the corresponding indicator field SPEED LIMIT and/or the associated digits start to blink. This indication, has priority; other data containing a warning, for example exceeding a maximum temperature, pressure or some other maximum or minimum may also be assigned a priority, so that the associated indicator field will light up independently even if another indicator field is just being selected. A priority-based indicator system of this type is known from the prior art cited above. A warning function can also be given by showing a special symbol in the numeral indicator device 16, in particular at a position not otherwise needed. This special symbol and/or the blinking indications upon reaching or exceeding a limit can be switched on selectively, i.e. this function does not appear until the key 28 is actuated twice (during data entry).

Information which is interrogated often, e.g. the time of day, is assigned to a separate key 27 (TIME), which, preferably, has a distinct grip indentation shape. When this key is actuated, its one assigned magnitude lights up in the numeral indicator device 16. A bistable timing circuit can be added to this key, so that a return to the previously selected function takes place after a specific time. A return to the previous function can also be obtained by another actuation of the key 27.

The switch 29 serves to switch from a single trip (SINGLE) to several trips (MULT.). In the position "Single Trip" the storage elements of the computer are reset, i.e. the stored data are erased at the beginning of each trip, for example by turning on the ignition. This time serves as Zero time and Zero Kilometer (mileage) setting for data retrieved during the following trip. This reset function is inhibited in the other, multi-trip position of the switch 29, so that the data retrieved are referenced to all trips which took place since actuation of the switch 29. This feature is very advantageous for vacation trips or business trips lasting several days.

The switch 30 serves for switch-over to differing measuring systems, for example from kilometers and liters (KML) to miles and gallons (MI GAL). This advantageous feature relieves the manufacturer from producing two differing versions of the vehicle trip computer and is useful to drivers of vehicles which operate in countries using different systems of measure.

Figure 5:
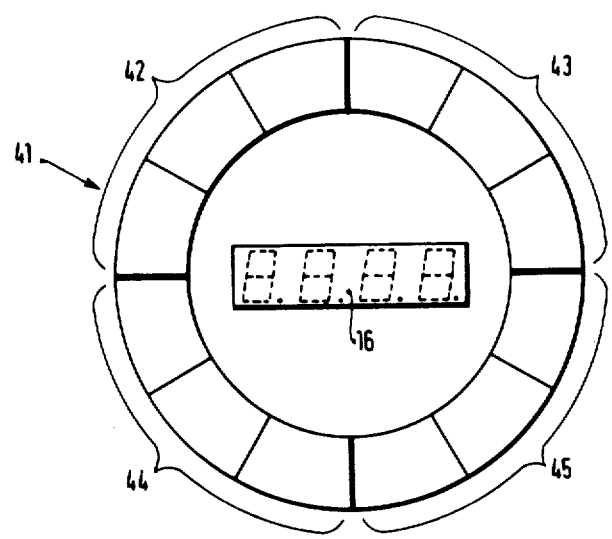
FIG. 5 is a graphic layout of an indicator device of a second exemplary embodiment.

The second exemplary embodiment of an indicator device 41, shown in FIG. 5, is constructed in the form of a circular disk. The disk is subdivided into four circular segments 42-45 each encompassing 90 degrees. Each circular segment contains three adjacent indicator fields whose function corresponds to those of the indicator fields in columns 11-15 according to FIG. 1. The labelling of the indicator fields has been omitted for the sake of clarity. The numeral indicator device 16 is located in the middle of the circular disk.

Figure 6:
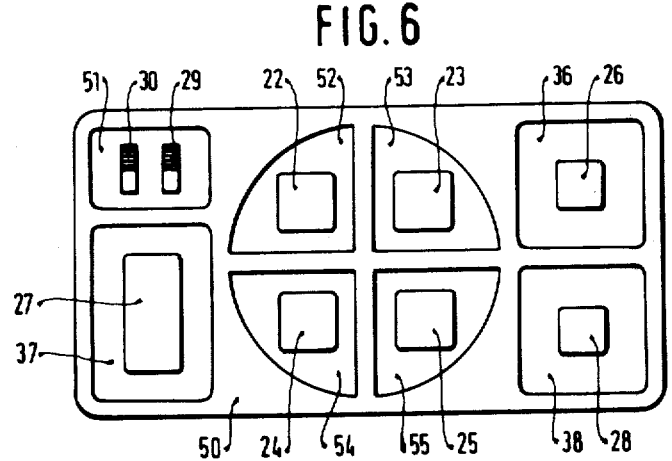
FIG. 6 is a graphic layout of the operating components of the second exemplary embodiment.

In the second example of an operating component 50, shown n FIG. 6, the keys 22-25 are located in grip indentations 52-55 whose shape is similar to that of circular segments 42-45 and the keys 22-25 are assigned to the indicator fields of the circular segments 42-45. The function of the keys 22 to 25 corresponds to the first exemplary embodiment, i.e., a repeated actuation of one of the keys successively selects the indicator fields of the associated region of the indicator device, and the selected fields light up sequentially. The numeral indicator device 16 is once again associated with the selected indicator field. Located to the right of and adjacent to the grip indentations 52 to 55 are two grip indentations 36, 38 for the key switches, 26, 28. Located to the left of and adjacent to the grip indentations 52 to 55 is the grip indentation 37 with the key 28. Above the grip indentation 37 lies a grip indentation 51 for the two switches 29, 30. The function of these switches is the same as in the first exemplary embodiment.

The arrangement of indicator fields and their associated keys is not limited to that of the two exemplary embodiments. It is essential however, that several indicator fields be associated with a given key, and that the layout of the keys correspond substantially to the layout of the associated groups of indicator fields. This makes it possible to find the correct key quickly and without looking, after an incorrect actuation.

Advantageously, the indicator device 10, 41 is located within the field of vision of the driver, i.e., in or above the instrument panel, or for example near the rear view mirror, the display may also be reflected on the windshield or a liquid crystal display may be embedded in the windshield.

Advantageously, the operating component 20, 50 is located within the easy reach of the driver; i.e. near the gear selector or in the vicinity of the steering wheel. A shared accommodation is also possible to reduce cost.

The operating component 20, 50 can advantageously be made removable from its mounting. In that case, data from the operating component is transmitted to the computer by wireless means, especially by infrared rays. The passengers then have the opportunity of sharing in the use of the computer; i.e., to enter data and to retrieve data and need not consult and distract the driver. Various other functions, for example, the actuation of theft protection outside the vehicle can also be accomplished by means of the removable operating component.

Power for the infrared transmitter is suitably supplied by rechargable batteries which can be recharged via a plug in the mounting.

Figure 7:
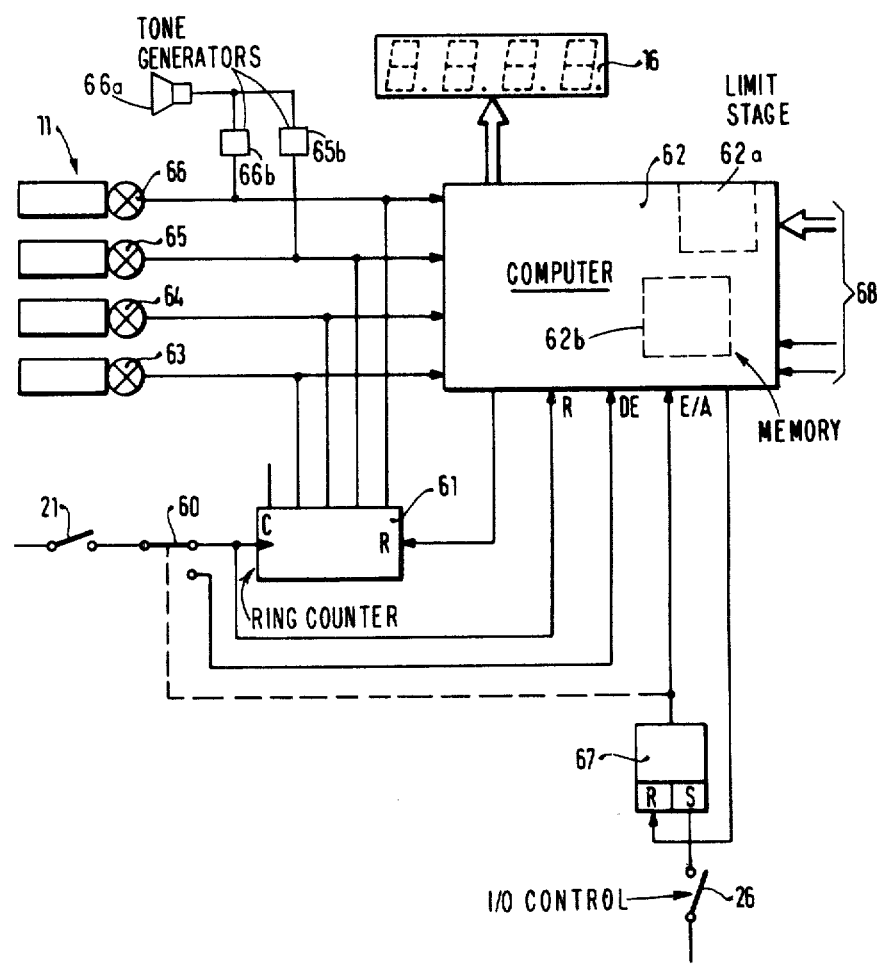
FIG. 7 is a schematic diagram of a circuit for the realization of several operating functions.

Various methods for data entry and retrieval to and from a computer as well as data displays are known, for example from the German Patent Disclosure Document DE-OS 2 333 908 to which U.S. Pat. Nos. 4,126,898 and Division 4,127,897, Spangler et al. correspond. Some of these methods will now be explained with the aid of FIG. 7.

In a first position of a switch 60, the key 21 is connected to the clock input C of a ring counter 61 and to the reset input R of a computer 62. In a second position of the switch 60, the key 21 is connected to the data entry input DE of the computer 62. Four of the five outputs of the counter 61 are connected to respective lamps (or light-emitting diodes) 63-66 and to the computer 62. One computer output is connected to the reset input of the counter 61. The lamps 63-66 are assigned to the display fields of the column 11. For the sake of the clarity, only a single column of display or indicator fields and the associated key 21 are shown. The numeral indicator device 16 is also connected to the computer 62. The data entry key 26 (I/O CONTROL) is connected to the set-input of a flipflop 67 whose output is connected to one entry/retrieval input of the computer 62, and also controls the switch 60. The reset input of the flipflop 67 is controlled by the computer 62. Further inputs 68 of the computer 62 symbolically represent other keys and switches and the entry of further data, for example, signals from sensors for speed, temperature, fuel status, etc. Methods for entering and processing such data are known and described in greater detail in the prior art cited above. The computer may include a limit stage 62a, in accordance with known technology, to provide a limit warning output. The computer also has the usual memory stage, e.g. memory 62b.

Each input pulse steps the ring counter 61 from one output to the next. Thus if the key 21 is actuated, the counter 61 switches from the first un-connected output to the second output, thereby lighting the lamp 63 and optically accentuating the corresponding indicator field of the column while the corresponding data is entered into the computer 62. Ring counters not shown assigned to the remaining columns 12-15 are reset simultaneously. A renewed actuation of the key 21 switches the system to the next lamp 64 and the next indicator field. Any desired indicator field of the column 21 can thus be selected by means of repeated actuation of the key 21. Once the desired indicator field is chosen and associated numerical information is to be entered, the flipflop 67 is set by actuation of the key 26, thereby switching the computer 62 over to data entry and placing the switch 60 into its other position. In that position it is connected to the data entry input DE of the computer 62, so that numerical values which appear on the numerical indicator device 16 can now be entered into the computer 62 by actuation of the key 21 as described above in relation to FIG. 2. Actuation of the key 28 (not shown in detail) makes these data available to the computer 62 for further processing, and the flipflop 67 is reset. The functions of the flipflop 67, the switch 60, and the ring counter 61 are advantageously performed by the computer 62. The representation according to FIG. 7 serves merely to clarify the functions.

Advantageously, the functions of the vehicle trip computer and other control functions for the vehicle, for example, ignition control and fuel injection control are combined within a single computer to which the various sensors and transducers of the vehicle are all connected. The shared computer, or a separate computer, may also include still other data systems, for example, a short trip recorder for storing data relevant to accidents over a defined traversed distance, as described independently in the Swiss patent 549 804. It may also be advantageous to include a control circuit for automatic or semiautomatic parking (backup) of a vehicle as described independently in the German Patent Disclosure Document DE-OS 23 39 600. The optimum path required for this maneuver can, for example, exist in a ROM as a command value, which is then compared with the steering angle as the actual value during parking and the control deviation is used to actuate a steering mechanism. All data indications, e.g. field selection, warnings etc., although described as optical for the sake of examples, can additionally be produced acoustically, e.g. by means of beeps or tones of specific duration; the entry or retrieval of the corresponding numerals or other information can be acknowledged acoustically via a loudspeaker 66a, providing an acoustic output from a beep or tone generator 65b, 66b upon energization of lamp or LED 66. Other similarly connected speakers or beep or tone generators may be used. The driver can thus enter and/or retrieve data without needing to look at an operating component or at an indicator device. His/her distraction from traffic events is therefore minimized. A micro-computer is particularly well suited for performing the computing tasks of the vehicle trip computer according to the invention.

The foregoing description of preferred embodiments of the invention is given by way of example only. Various modifications lying within the competence of a person skilled in the art are possible and features of one embodiment may be used in another, all within the scope of the invention.

We claim:
1. In combination with an automotive vehicle,
a vehicle trip computer having
an optical display device (10, 41) for indicating and presenting data, including
a numerical display device (16) for the display of numerical values and
a plurality of display fields, each characterizing and identifying the significance or import of the displayed numerical value, on said numerical display device;
an operating component (20, 50) for entry and/or retrieval of data including a plurality of keys (20-25);
a data supply computer (62) furnishing a plurality of numerical values, representative of operating parameters and information data relative to at least the then existing operation of the vehicle;
the display fields being adjacently positioned and located in groups or sets (11-15; 42-45);
one key (21-25), each, being assigned to each group or set;
counter means (61) connected to the keys and counting the number of times a key is operated, each key operation being associated with a selected operating parameter relative to at least the then existing operation of the vehicle, or a selected significant information item;
signal transmission link means connecting respective ones of the count output of the counter means to
(a) the data supply computer to provide outputs for display on the display device (16) of numerical values pertaining to the selected operating parameter of the selected significant information item, and
(b) to respective display fields of the group, or set, associated with a respective count to sequentially switch display of a specific display field in the display fields in the group, or set, upon repeated operation of a single key,
whereby the optical display device will display
(a) on the numerical display device, a numerical value representative of the selected operating parameter, or information item selected by a respective key and the respective number of operations of the key, and
(b) on the display fields, a representation of the parameter, or the significance of the information item being shown in form of a numerical value on the numerical display device (16) upon operation of only a single key; and wherein the groups or sets (11-15; 42-45) of the display fields are disposed in a predetermined geometric layout: and the keys (21-25) associated with the sets or groups of said display fields are located in a layout having a similar geometric configuration.

2. A vehicle trip computer according to claim 1, wherein the groups or sets of display fields are arranged in columns.

3. A vehicle trip computer according to claim 1, wherein the groups or sets of display fields are arranged as segments of a circle.

4. A vehicle trip computer according to claim 1, including means for optical accentuation of a display field.

5. A vehicle trip computer according to claim 1, including means (65a, 66b, 66a) for acoustical identification of the entered data.

6. A vehicle trip computer according to claim 1, including a key switch (27) for switching to a specific display field, in particular to the display of the time, and means for switching back to the previously selected display field after a preset time interval.

7. A vehicle trip computer according to claim 1, including a key switch (27) for switching to a specific display field, in particular the display of the time, and means for switching back to the previously selected display field upon the renewed actuation of said key switch (27).

8. A vehicle trip computer according to claim 1, including a further key switch (28, MEM.) connected to the computer and to the numerical display device (16) and establishing a signal path to enter displayed numerical values into the computer (62).

9. A vehicle trip computer according to claim 1, wherein the computer comprises a memory;
a switching apparatus (29) is provided, connected to the computer (62) and having a first position in which stored data in the memory are erased upon interruption of the trip, or resumption of vehicle operation after an interruption of the trip;
and a second position, in which stored data in the memory are preserved.

10. A vehicle trip computer according to claim 1, including a switching apparatus (30) for displaying the numerical values in selected different systems of measure.

11. A vehicle trip computer according to claim 1, wherein the computer includes a memory for controlled parking of the vehicle.

12. A vehicle trip computer according to claim 1 wherein the optical display device (10, 41) is located in the vicinity of the instrument panel,
and the operating component for entry and/or retrieval of data (20, 50) is located within easy reach of one hand of the driver adjacent to the operator location.

13. A vehicle trip computer according to claim 1 wherein the computer compares received signals of varying values representative of said data with a limit value, and the display device (10, 41) furnishes an optical and/or acoustical warning triggerable upon identification that the signal has reached the limit value as determined by said computer during operation of the vehicle;
and wherein said computer is connected for priority switching of the indicator device (10, 41) to indicate the limit value.

14. A vehicle trip computer according to claim 13, wherein the display device is connected to provide an optical identification of the entered limit value.

15. A vehicle trip computer according to claim 1, wherein the operating component (20, 50) is removably from its mounting, and the transmission link comprises a wireless link.

16. A vehicle trip computer according to claim 15, wherein the wireless link is transmittable in the infrared range of the frequency spectrum.

17. A vehicle trip computer according to claim 1, including a switching device (26) connected to the computer (62), the keys (21-25), and the numerical display device (16) and interconnecting the keys, selectively, with the computer to place the keys and the computer in a data entry operating mode to permit data entry into the computer of numerical values as displayed, and selectively upon operation of a key (21-25) with the computer being in the data entry mode.

18. A vehicle trip computer according to claim 17, wherein said switching device (26) is a two-stage key switch, wherein a switching to the data entry mode takes place in the second stage.

19. A vehicle trip computer according to claim 17, including means for optical and/or an acoustical identification when the computer is in the data entry mode.

20. A vehicle trip computer according to claim 17, wherein said switching device (26) comprises an input-output control key switch whose actuation results in switching the computer to the data entry mode.

21. Vehicle trip computer according to claim 17, including a further key switch (28, MEM.) connected to the computer (62), the numerical display device (16) and the switching device (26) for transferring data to the computer upon actuation of the further key switch (28) for the entry of data, as displayed by the display device and representative of an operating condition of the vehicle into the computer directly upon actuation of the switching device (26) and independently of operation of one of said plurality of keys (21-25).

22. A vehicle trip computer according to claim 17, wherein at least one (25) of the keys (21-25) is connected to the display device (16) and the computer (62) for sequential scan-switching of numerical values displayed by the display device.

23. A vehicle trip computer according to claim 22, wherein the at least one key (25) is connected to the display device of the computer for shifting of digits displayed by the display device.

24. A vehicle trip computer according to claim 22, wherein the keys (21-25) are each connected for sequential scan-switching;
logic means are provided sensing operation of any one of the keys and effecting, upon sensing operation of another key, shifting of digits and subsequent continuing sequential scan-switching by any other selected key.

25. A vehicle trip computer according to claim 22, wherein a predetermined one of the keys (21-25) is connected for sequential scan-switching;
and logic means are provided sensing operation of any one of the keys and effecting, upon sensed operation of any other key, shifting of digits only.

* * * * *